(12) United States Patent
Tanaka et al.

(10) Patent No.: US 10,958,068 B2
(45) Date of Patent: Mar. 23, 2021

(54) DC TRANSMISSION SYSTEM AND DC/DC CONVERTER USED IN THE SAME

(71) Applicant: Mitsubishi Electric Corporation, Chiyoda-ku (JP)

(72) Inventors: Miwako Tanaka, Chiyoda-ku (JP); Toshiyuki Fujii, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 6 days.

(21) Appl. No.: 16/343,096

(22) PCT Filed: Sep. 7, 2017

(86) PCT No.: PCT/JP2017/032199
§ 371 (c)(1),
(2) Date: Apr. 18, 2019

(87) PCT Pub. No.: WO2018/135031
PCT Pub. Date: Jul. 26, 2018

(65) Prior Publication Data
US 2020/0052485 A1 Feb. 13, 2020

(30) Foreign Application Priority Data
Jan. 19, 2017 (JP) .............................. JP2017-007373

(51) Int. Cl.
*H02J 1/00* (2006.01)
*H02J 3/38* (2006.01)
(Continued)

(52) U.S. Cl.
CPC ................. *H02J 1/00* (2013.01); *H02J 3/38* (2013.01); *H02M 3/33576* (2013.01); *H02M 7/06* (2013.01)

(58) Field of Classification Search
CPC ........ A47L 9/00; A47L 9/2831; A47L 9/2847; A47L 9/2857; A47L 9/2889; F03D 7/00;
(Continued)

(56) References Cited

U.S. PATENT DOCUMENTS

| 8,305,778 B2 | 11/2012 | Jiang-Hafner |
| 2010/0157638 A1* | 6/2010 | Naiknaware ............ H02J 3/386 363/131 |

(Continued)

FOREIGN PATENT DOCUMENTS

| JP | 7-131936 A | 5/1995 |
| JP | 9-200952 A | 7/1997 |

(Continued)

OTHER PUBLICATIONS

International Search Report dated Nov. 28, 2017 in PCT/JP2017/032199 filed on Sep. 7, 2017.

*Primary Examiner* — Lincoln D Donovan
*Assistant Examiner* — Dave Mattison
(74) *Attorney, Agent, or Firm* — Xsensus LLP

(57) ABSTRACT

A DC transmission system transmits AC power generated by a generator to an AC distribution grid and a DC distribution grid using DC power. The DC transmission system includes an AC/DC converter, a DC/DC converter, and a DC/AC converter. The AC/DC converter outputs DC power by converting AC power from the generator. The DC/DC converter boosts a first voltage of the DC power outputted from the AC/DC converter, into a second voltage. The DC/AC converter outputs, to the AC distribution grid, AC power by converting the DC power outputted from the DC/DC converter. When the second voltage changes, the DC/DC converter controls the first voltage in response to the change in the second voltage.

12 Claims, 12 Drawing Sheets

(51) Int. Cl.
*H02M 3/335* (2006.01)
*H02M 7/06* (2006.01)

(58) Field of Classification Search
CPC .......... F03D 7/0284; H02H 7/00; H02H 7/06;
H02J 1/00; H02J 2300/00; H02J 2300/28;
H02J 3/00; H02J 3/38; H02J 3/381; H02J
3/386; H02M 3/00; H02M 3/33576
USPC .......................................................... 307/22
See application file for complete search history.

(56) References Cited

U.S. PATENT DOCUMENTS

2015/0145328 A1    5/2015  Ohshima et al.
2017/0009745 A1*   1/2017  Brogan ..................... H02P 9/48

FOREIGN PATENT DOCUMENTS

| | | |
|---|---|---|
| JP | 3261947 B2 | 3/2002 |
| JP | 2003-501993 A | 1/2003 |
| JP | 2005-224009 A | 8/2005 |
| JP | 2014-27762 A | 2/2014 |
| JP | 2014-128159 A | 7/2014 |
| JP | 2015-6066 A | 1/2015 |
| JP | 2015-27196 A | 2/2015 |
| JP | 2016-1981 A | 1/2016 |
| WO | WO 00/74198 A1 | 12/2000 |

* cited by examiner

DC TRANSMISSION SYSTEM AND DC/DC CONVERTER USED IN THE SAME

TECHNICAL FIELD

The present invention relates to a DC transmission system and a DC/DC converter used in the same, and particularly to a stabilization control of a DC transmission system in which AC power generated by wind power generation is converted into DC power to be transmitted and supplied to an AC distribution grid, when an abnormality occurs in the AC distribution grid.

BACKGROUND ART

A DC transmission system in which high-voltage DC power is transmitted between bulk power converters interconnected with direct current is known. DC transmission is advantageous over AC transmission in that the DC transmission is free from current loss caused by the skin effect and thus has lower transmission loss in long-distance transmission. Further, DC transmission is also advantageous because it requires only two power lines; whereas AC transmission, which uses three-phase power, requires three power lines.

Particularly in recent years, DC transmission, which is suitable for bulk power transmission, is increasingly employed with the spread of renewable energy, such as photovoltaic power generation or wind power generation.

Japanese Patent Laying-Open No. 2016-1981 (PTL 1) discloses a system for transmitting power generated by an offshore wind power generator to an overland electrical grid. PTL 1 proposes a system in which AC power generated by a wind power plant is converted into direct current by an AC/DC converter to be collected and boosted by a DC/DC converter at an offshore conversion station, so that the power is transmitted to an overland electrical grid via offshore or submarine transmission cables.

FIG. 11 is a schematic diagram of a DC transmission system 500 disclosed in PTL 1. In DC transmission system 500 in PTL 1, an AC/DC converter 510 converts AC power from a wind power plant 10 including a generator 12 coupled to a windmill (blades) 14, into DC power; a DC/DC converter 520 boosts the voltage of the DC power; and a transmission line 540 transmits the power to the land. On the land, a DC/AC converter 530 in DC transmission system 500 converts the transmitted DC power into AC power to supply the power to an overland electrical grid. The supplied AC power is adjusted in voltage by a transformer 40 as appropriate and is supplied to an AC device 50.

During a normal operation, a controller 550 of DC transmission system 500 shown in FIG. 11 uses DC/AC converter 530 to control the voltage of the DC transmission grid (transmission voltage), and uses DC/DC converter 520 to control the voltage of the DC collection grid (collection voltage). On the other hand, when DC/AC converter 530 stops due to abnormality in the AC distribution grid or in DC/AC converter 530, DC/AC converter 530 cannot control the voltage of the DC transmission grid. Accordingly, in the system in PTL 1, when DC/AC converter 530 stops, the control is switched so that DC/DC converter 520 controls the transmission voltage and so that AC/DC converter 510 controls the collection voltage, as shown in FIG. 12. Such a switch of control stabilizes the DC grid voltage at the time of occurrence of abnormality.

Japanese Patent Laying-Open No. 2014-27762 (PTL 2) discloses a dispersed power system including a photovoltaic power plant. In the dispersed power system in PTL 2, a DC/DC converter boosts the voltage of DC power generated by the photovoltaic power plant, and an inverter converts the DC power into AC power, so that the power is supplied to a load grid and an AC distribution grid. When an abnormality occurs in the AC distribution grid, then a switch that interconnects the inverter and the AC distribution grid is shut off, and the operation mode of the DC/DC converter and the inverter is switched. Thus, the power transmission to the load grid can be continued.

CITATION LIST

Patent Literature

PTL 1: Japanese Patent Laying-Open No. 2016-1981
PTL 2: Japanese Patent Laying-Open No. 2014-27762

SUMMARY OF INVENTION

Technical Problem

In the DC transmission system in PTL 1 described above, when the DC/AC converter stops due to abnormality in, for example, the AC distribution grid, the change in DC voltage can be curbed by using the DC/DC converter to control the transmission voltage and by using the AC/DC converter to control the collection voltage. However, the system in PTL 1 is not configured to adjust power generation at the wind power plant at the time of occurrence of abnormality. At the time of occurrence of abnormality, even if the DC grid voltage is adjusted, the power generation at the wind power plant higher than the power consumption at the DC distribution grid would cause excessive power input to the DC grid, thus increasing the DC grid voltage.

For reducing power generation at a wind power plant, generally, the rotational speed of the windmill itself is reduced by controlling the pitch and stall of the windmill. However, there is a considerable time lag between detection of a stop of DC/AC converter and output of an instruction to the windmill controller. Also, since the windmill itself has a great inertia and takes a long time to actually reduce the rotational speed, the power generation often cannot be reduced in a short time. Accordingly, when the DC/AC converter stops, excessive power flowing from the wind power plant may raise the DC grid voltage, even if the DC/DC converter and the AC/DC converter switch their control as described in PTL 1. If the DC grid voltage exceeds a threshold value for protection from overvoltage, the DC/DC converter and the AC/DC converter will stop. As a result, the power supply to the DC distribution grid cannot be properly performed.

The present invention has been made to solve such a problem. An object of the present invention is to provide a DC transmission system in which AC power generated by a generator is converted into DC power to be transmitted, the DC transmission system being capable of continuing DC transmission by appropriately adjusting the DC grid voltage even when a DC/AC converter for supplying power to an AC distribution grid stops.

Solution to Problem

A DC transmission system according to the present invention transmits AC power generated by a generator to an AC distribution grid and a DC distribution grid using DC power. The DC transmission system includes an AC/DC converter, a DC/DC converter, and a DC/AC converter. The AC/DC converter outputs DC power by converting AC power from the generator. The DC/DC converter outputs DC power having a second voltage by converting the DC power having a first voltage outputted from the AC/DC converter. The DC/AC converter outputs, to the AC distribution grid, AC power by converting the DC power outputted from the DC/DC converter. The DC power outputted from the DC/DC converter is also transmitted to the DC distribution grid. When the second voltage changes due to the stop of the DC/AC converter, the DC/DC converter controls the first voltage in response to the change in the second voltage.

A DC transmission system according to another aspect of the present invention transmits AC power generated by a generator to an AC distribution grid and a DC distribution grid using DC power. The DC transmission system includes an AC/DC converter, first and second DC/DC converters, and a DC/AC converter. The AC/DC converter outputs DC power by converting AC power from the generator. The first DC/DC converter outputs DC power having a second voltage by converting the DC power having a first voltage outputted from the AC/DC converter. The second DC/DC converter outputs DC power having a third voltage by converting the DC power having the second voltage outputted from the first DC/DC converter. The DC/AC converter outputs, to the AC distribution grid, AC power by converting the DC power outputted from the second DC/DC converter. The DC power outputted from the second DC/DC converter is also transmitted to the DC distribution grid. When the DC/AC converter stops, the second DC/DC converter controls the third voltage in response to a change in the second voltage, and the first DC/DC converter controls the first voltage in response to a change in the second voltage.

Advantageous Effects of Invention

According to the present invention, in a DC transmission system in which AC power generated by a generator is converted into DC power to be transmitted, even when a DC/AC converter for supplying power to an AC distribution grid stops, an increase in DC grid voltage can be properly curbed by adjusting power input to a DC/DC converter in accordance with the change in DC grid voltage. This prevents each converter from being stopped by an overvoltage protection function. Thus, DC transmission can be continued.

DESCRIPTION OF EMBODIMENTS

Figure 1:
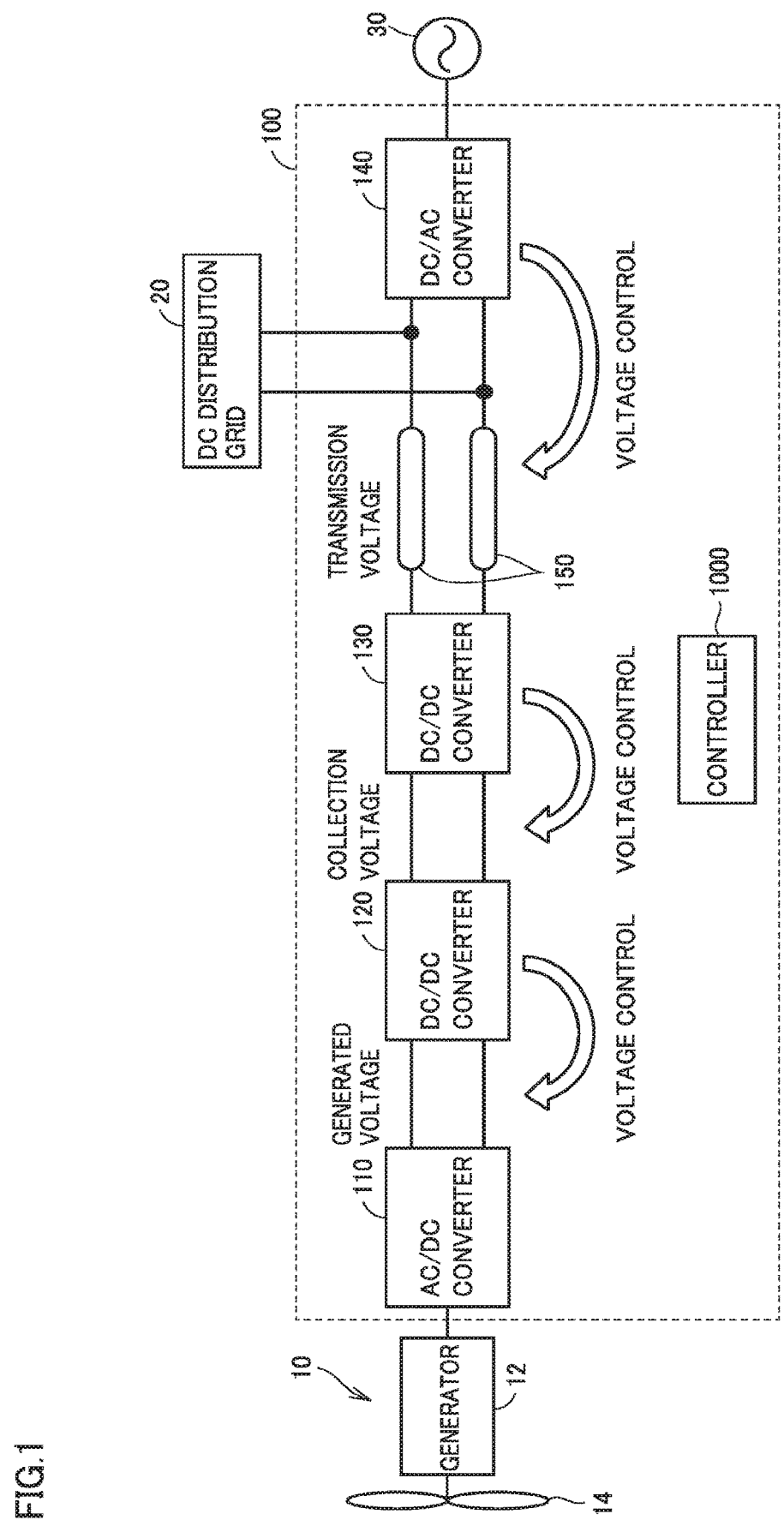
FIG. 1 is a schematic diagram of a DC transmission system according to embodiment 1.

Embodiments of the present invention are hereinafter described in detail with reference to the drawings. Identical or corresponding components in the drawings are identically denoted, and the explanation of such components is not repeated.

Embodiment 1

FIG. 1 is a schematic diagram of a DC transmission system 100 according to embodiment 1. With reference to FIG. 1, DC transmission system 100 converts AC power generated by wind power plant 10 into DC power, the wind power plant 10 being located offshore or on a mountain, for example. DC transmission system 100 transmits the converted power in the form of DC power to supply the DC power to a DC distribution grid 20 including a DC load. DC transmission system 100 also converts the transmitted DC power into AC power to supply the AC power to an AC distribution grid 30.

Wind power plant 10 includes generator 12 coupled to the shaft of windmill (blades) 14. Rotating windmill 14 rotates the rotor of generator 12, thus allowing generator 12 to generate AC power.

DC transmission system 100 includes an AC/DC converter 110, a self-commutated first DC/DC converter 120, a self-commutated second DC/DC converter 130, a DC/AC converter 140, a transmission line 150, and a controller 1000 to control each converter. Although controller 1000 is shown as one element in FIG. 1, the functions of controller 1000 may be individually provided for each converter.

AC/DC converter 110 outputs DC power by converting AC power generated by generator 12. The voltage of DC power outputted from AC/DC converter 110 is also referred to as a "generated voltage" in embodiment 1. DC/DC converter 120 converts the voltage (generated voltage) of the DC power outputted from AC/DC converter 110 into another voltage, and supplies the converted voltage to DC/DC converter 130.

FIG. 1 includes only one wind power plant 10, only one AC/DC converter 110, and only one DC/DC converter 120. If a plurality of wind power plants 10 are provided, however, one AC/DC converter 110 and one DC/DC converter 120 are provided for each wind power plant 10, where DC/DC converter 120 converts and collects DC power. The voltage of DC power converted and collected by (a plurality of) DC/DC converter(s) 120 is also referred to as a "collection voltage" in embodiment 1.

DC/DC converter 130 further boosts the voltage (collection voltage) of the DC power converted and collected by DC/DC converter 120, and supplies the resultant to the DC transmission grid. The voltage of DC power transmitted in the DC transmission grid is also referred to as a "transmission voltage" in embodiment 1.

If wind power plant 10 is disposed offshore for example, AC/DC converter 110 to DC/DC converter 130 are disposed in an offshore conversion station adjacent to wind power plant 10. In the DC transmission grid, DC power obtained by conversion by DC/DC converter 130 is transmitted to the land via transmission line 150, for example.

A part of DC power transmitted via transmission line 150 is supplied to DC distribution grid 20 in the form of DC power, and another part is supplied to DC/AC converter 140 disposed in an overland conversion station. DC/AC converter 140 converts DC power received from transmission line 150 into AC power and supplies it to AC distribution grid 30.

In DC transmission system 100 shown in FIG. 1, during a normal operation, AC/DC converter 110 controls the AC voltage produced by wind power plant 10. If AC/DC converter 110 is a converter including a diode rectifier as described later with reference to FIG. 2, the DC voltage (generated voltage) outputted from the diode rectifier changes depending on the rotational speed of windmill 14. DC/DC converter 120 regulates the generated voltage and boosts the generated voltage into the collection voltage. DC/DC converter 130 regulates the collection voltage, and DC/AC converter 140 regulates the transmission voltage.

Figure 2:
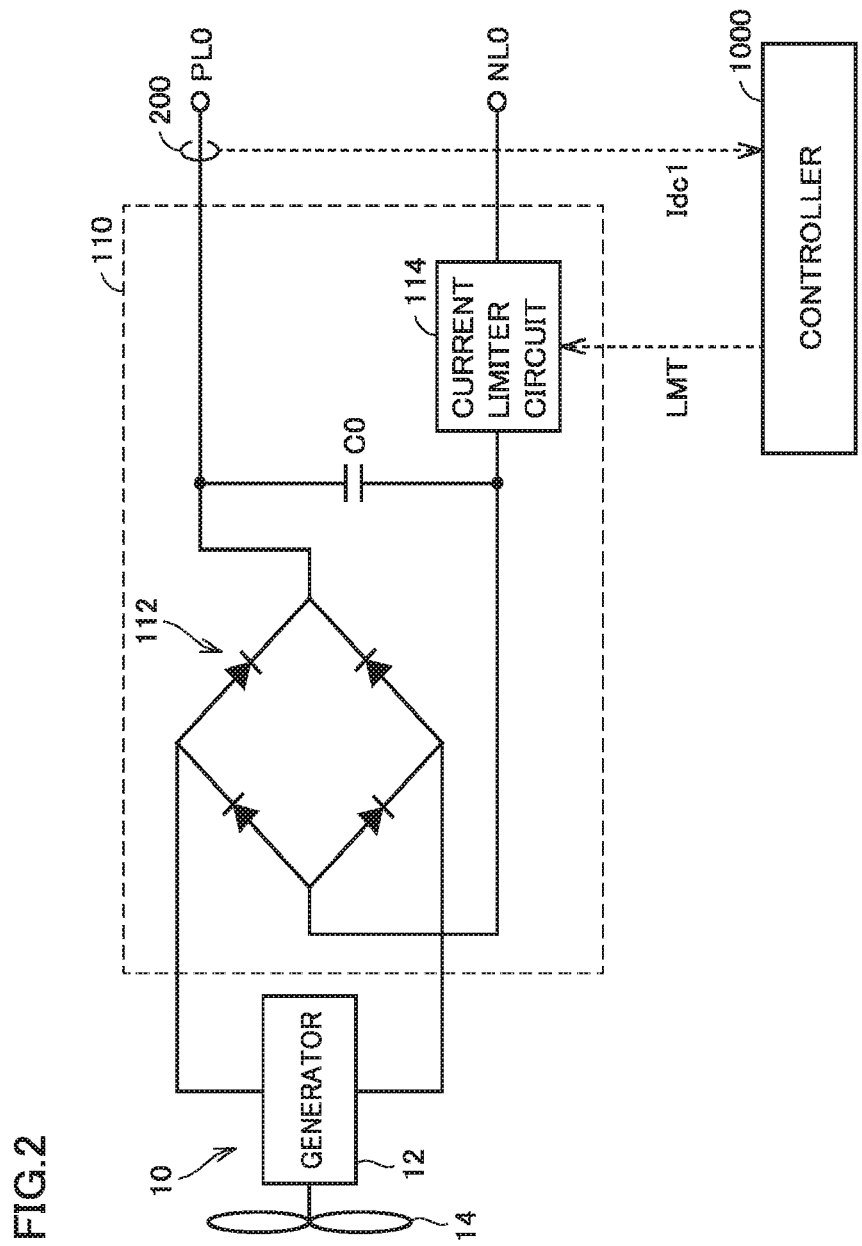
FIG. 2 shows an example of detailed configuration an AC/DC converter in FIG. 1.

FIG. 2 shows an example of detailed configuration of AC/DC converter 110. With reference to FIG. 2, AC/DC converter 110 includes a diode bridge 112, a smoothing capacitor C0, and a current limiter 114.

Diode bridge 112 full-wave rectifies AC power generated by generator 12. DC power obtained by the rectification is smoothed by smoothing capacitor C0 to be supplied to power lines PL0, NL0.

Current limiter 114 is provided on, for example, power line NL0. Current limiter 114 limits the amount of current flowing through the circuit, in accordance with a control instruction LMT from controller 1000. Controller 1000 produces control instruction LMT for current limiter 114 based on a detection value Idc1 from a current sensor 200 provided on power line PL0. Thus, AC/DC converter 110 uses current limiter 114 to control the current flowing through the circuit, thereby controlling the AC voltage generated by wind power plant 10.

Figure 3:
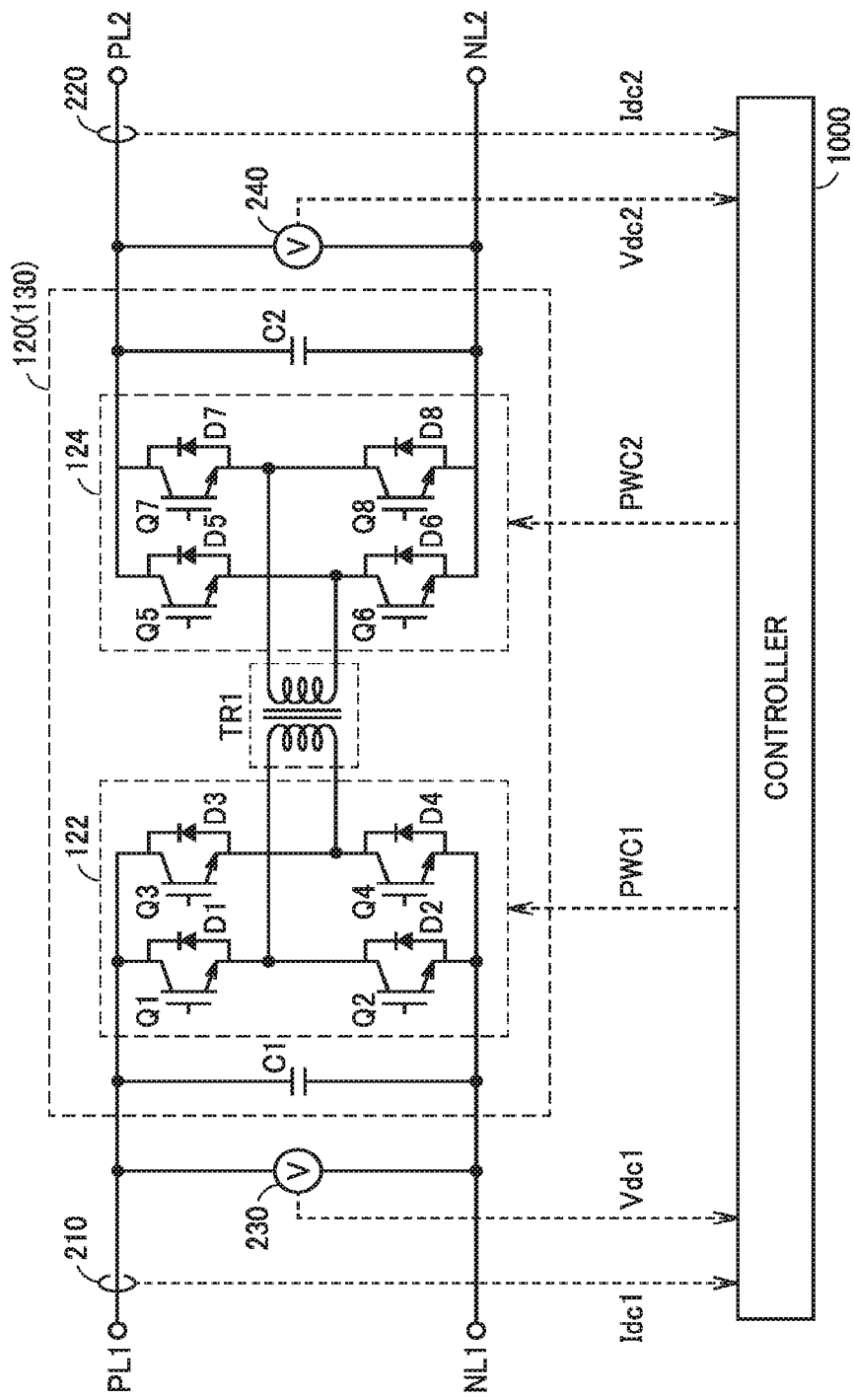
FIG. 3 shows an example of detailed configuration of a DC/DC converter in FIG. 1.

FIG. 3 shows an example of detailed configuration of DC/DC converters 120, 130. In the present embodiment, DC/DC converters 120, 130 basically have the same hardware configuration. Accordingly, the following describes DC/DC converter 120 as an example.

With reference to FIG. 3, DC/DC converter 120 includes two self-commutated full-bridge inverter circuits 122, 124, an insulating transformer TR1, and smoothing capacitors C1, C2.

Inverter circuit 122 includes semiconductor switching devices Q1, Q2 connected in series between power lines PL1, NL1, and semiconductor switching devices Q3, Q4 connected in series between power lines PL1, NL1. To semiconductor switching devices Q1 to Q4, diodes D1 to D4 are respectively connected in anti-parallel.

Power lines PL1, NL1 are respectively connected to power lines PL0, NL0 on the output side of AC/DC converter 110 in FIG. 2. Smoothing capacitor C1 is connected between power lines PL1, NL1 to smooth the DC voltage supplied from AC/DC converter 110.

Inverter circuit 122, which is controlled by a control instruction PWC1 from controller 1000, converts DC power smoothed by smoothing capacitor C1 into AC power and outputs the AC power to transformer TR1. Transformer TR1 receives the AC power supplied from inverter circuit 122 to its primary winding, transfers the received AC power to the secondary winding in an insulated manner, and outputs the transferred AC power to inverter circuit 124.

Inverter circuit 124 basically has the same configuration as inverter circuit 122. Inverter circuit 124 includes semiconductor switching devices Q5, Q6 connected in series between power lines PL2, NL2, and semiconductor switching devices Q7, Q8 connected in series between power lines PL1, NL1. To semiconductor switching devices Q5 to Q8, diodes D5 to D8 are respectively connected in anti-parallel.

Inverter circuit 124, which is controlled by a control instruction PWC2 from controller 1000, converts AC power supplied from transformer TR1 into DC power with its voltage boosted into a voltage different from the input-side voltage. Smoothing capacitor C2 smoothes the DC power from inverter circuit 124 and outputs it to power lines PL2, NL2.

Inverter circuits 122, 124 are not limited to full-bridge inverters, but may be three-level inverters. Although FIG. 3 shows a case in which semiconductor switching devices Q1 to Q8 included in inverter circuits 122, 124 are IGBTs, this is not a limitation. Semiconductor switching devices Q1 to Q8 may be other self arc-extinguishing semiconductor switching devices.

Power lines PL1, PL2 are respectively provided with current sensors 210, 220. Current sensor 210 and current sensor 200 in FIG. 2 may be a shared one. Current sensor 210 detects the current flowing through power line PL1 and outputs the detection value Idc1 to controller 1000. Current sensor 220 detects the current flowing through power line PL2 and outputs the detection value Idc2 to controller 1000.

A voltage sensor 230 is provided between power lines PL1, NL1, and a voltage sensor 240 is provided between power lines PL2, NL2. Voltage sensor 230 detects the voltage between power lines PL1, NL1 (i.e., the voltage across smoothing capacitor C1) and outputs the detection value Vdc1 to controller 1000. Voltage sensor 240 detects the voltage between power lines PL2, NL2 (i.e., the voltage across smoothing capacitor C2) and outputs the detection value Vdc2 to controller 1000.

In DC/DC converter 120, DC voltage Vdc1 on the low-voltage side is a "generated voltage", and DC voltage Vdc2 on the high-voltage side is a "collection voltage". In DC/DC converter 130, on the other hand, DC voltage Vdc1 on the low-voltage side is a "collection voltage", and DC voltage Vdc2 on the high-voltage side is a "transmission voltage".

DC/DC converters 120, 130 perform control in such a manner that, the phase of one of inverter circuit 122 (the primary side of transformer TR1) and inverter circuit 124 (the secondary side of transformer TR1) being used as a reference, the phase of the other inverter circuit is shifted, while the duty of the gate drive is fixed to 50% by pulse width modulation (PWM) control. DC/DC converters 120, 130 thus control the DC voltage on one side. The following describes a case in which the phase of the high-voltage side (on the secondary side) is used as a reference, as an example.

Although not shown, DC/AC converter 140 includes a full-bridge inverter circuit as shown in FIG. 3, for example. The inverter circuit, which is controlled based on the control instruction from controller 1000, converts DC power supplied from DC/DC converter 130 into AC power and outputs the AC power to the AC distribution grid.

In DC transmission system 100 having such a configuration, if an abnormality (e.g. an accident) occurs in AC distribution grid 30 for example, DC/AC converter 140 stops to be electrically separated from AC distribution grid 30. DC/AC converter 140 also stops if an abnormality occurs in DC/AC converter 140 itself. When DC/AC converter 140 stops, the power supply to the AC distribution grid is interrupted. As a result, the power supplied from wind power plant 10 exceeds the power consumption at DC distribution grid 20, thus increasing the transmission voltage. The stop of DC/AC converter 140 makes the transmission voltage of the DC grid uncontrollable. When the transmission voltage and the collection voltage exceed the overvoltage threshold values of the corresponding converters, DC/DC converters 120, 130 will stop. Thus, stable power cannot be supplied to DC distribution grid 20.

Figure 4:
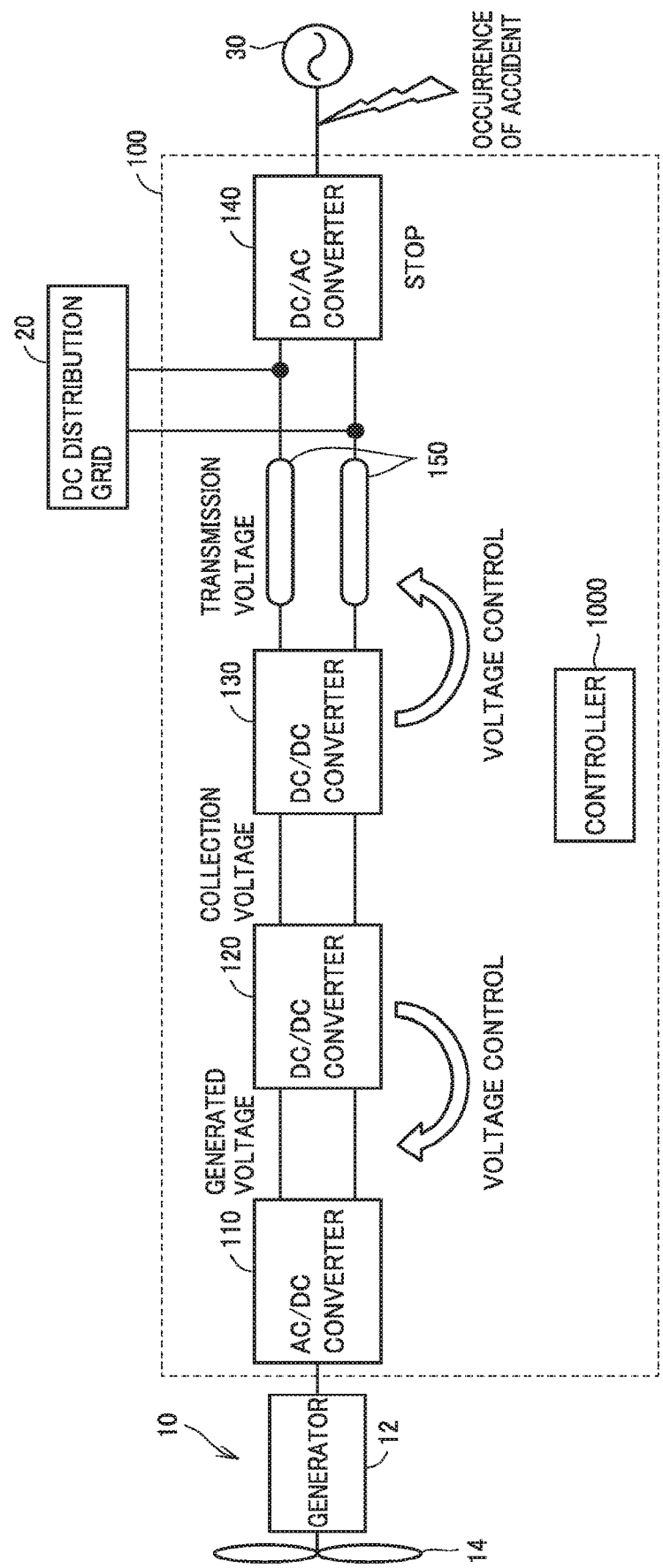
FIG. 4 is a diagram for explaining the control status of each converter when an abnormality occurs in an AC distribution grid in the DC transmission system shown in FIG. 1.

Accordingly, in embodiment 1, if DC/AC converter 140 stops due to abnormality in AC distribution grid 30 or in DC/AC converter 140, the converters switch the control as shown in FIG. 4. Specifically, if DC/DC converter 130 detects a change in transmission voltage (transmission voltage>threshold value), DC/DC converter 130 is autonomously switched from controlling the collection voltage to controlling the transmission voltage based on the change in collection voltage. If DC/DC converter 120 detects a change in collection voltage (collection voltage>threshold value), DC/DC converter 120 is autonomously switched from controlling the generated voltage to controlling the power generation from AC/DC converter 110 based on the change in collection voltage.

The power control by DC/DC converter 120 generally refers to the control in which the set value of the generated voltage is reduced, compared to a normal time, in accordance with the change amount (increase amount) of the collection voltage. For DC power, the relationship of "power=voltage×current" is satisfied. With the power fixed, therefore, a decrease in generated voltage causes an increase in current flowing through the circuit. At this time, the current flowing through the circuit is limited to the upper limit or less by current limiter 114 (FIG. 2) of AC/DC converter 110. Accordingly, the power flowing into DC/DC converter 120 itself is reduced. This can balance the demand and supply of power, between the power generation from wind power plant 10 and the power consumption at DC distribution grid 20. Thus, stable, continuous power supply to DC distribution grid 20 can be achieved.

Figure 5:
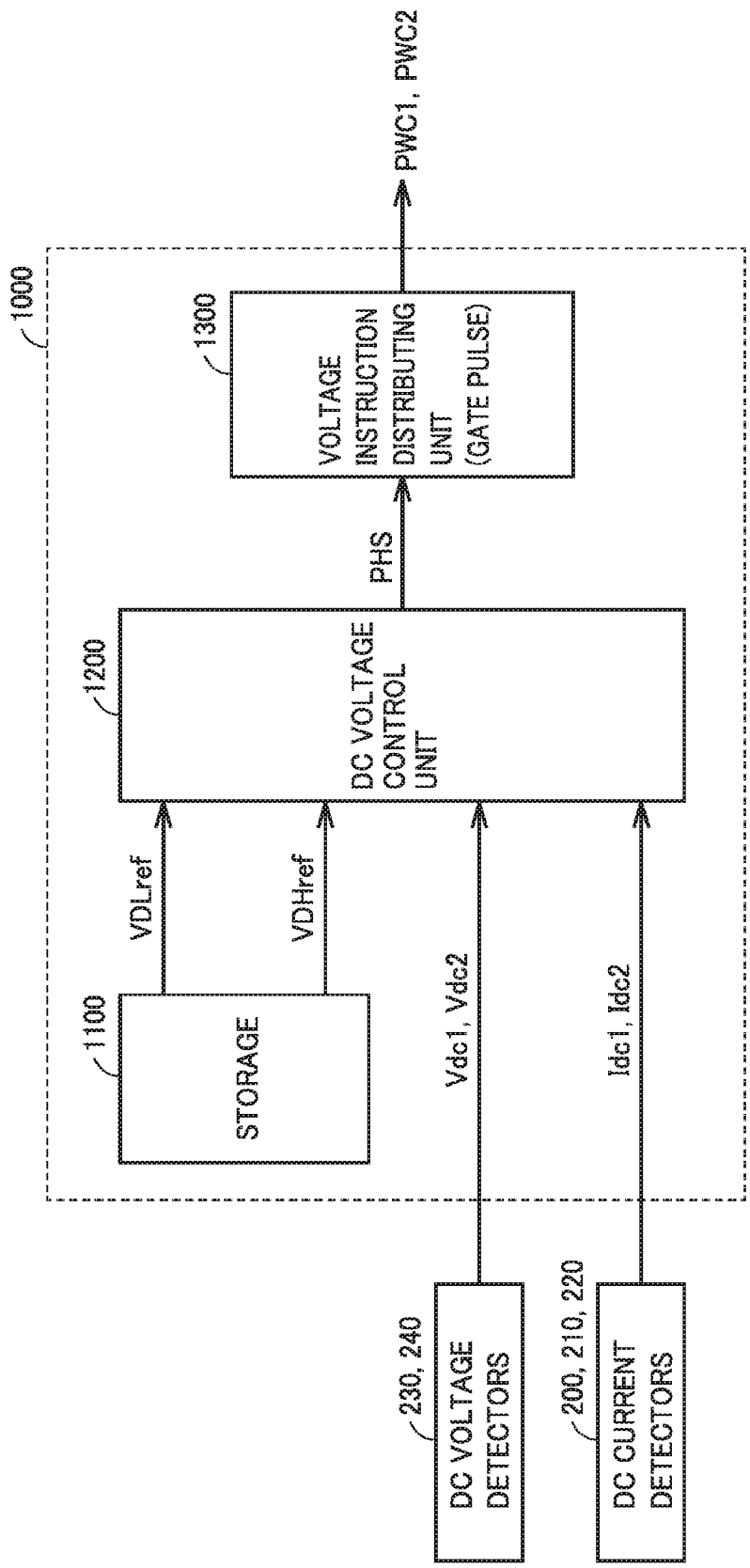
FIG. 5 is a functional block diagram related to control by a DC/DC converter, in a controller.

FIG. 5 is a functional block diagram of a part related to the control by DC/DC converters 120, 130, in controller 1000. With reference to FIG. 5, controller 1000 includes a storage 1100, a DC voltage control unit 1200, and a voltage instruction distributing unit 1300.

Storage 1100 stores target values, such as a low-voltage-side DC voltage instruction value VDLref and a high-voltage-side DC voltage instruction value VDHref of each DC/DC converter. Each of DC voltage instruction values VDLref, VDHref may be a predetermined fixed value, or may be variable in accordance with the power requested by a load grid, for example. Storage 1100 outputs these target values to DC voltage control unit 1200.

DC voltage control unit 1200 receives target values stored in storage 1100, detection values Vdc1, Vdc2 from DC voltage detectors (voltage sensors) 230, 240, and detection values Idc1, Idc2 from DC current detectors (current sensors) 200, 210, 220. DC voltage control unit 1200 uses these input values to calculate a phase instruction PHS between inverter circuits 122, 124 (i.e., a control amount for DC/DC converter) and outputs phase instruction PHS to voltage instruction distributing unit 1300.

Voltage instruction distributing unit 1300 produces control instructions PWC1, PWC2 (gate pulse signals) for controlling semiconductor switching devices Q1 to Q8 in inverter circuits 122, 124 to carry out phase instruction PHS from DC voltage control unit 1200, and outputs control instructions PWC1, PWC2 to the DC/DC converters. DC/DC converters 120, 130 perform power conversion by switching semiconductor switching devices Q1 to Q8 in accordance with control instructions PWC1, PWC2 produced by controller 1000.

Figure 6:
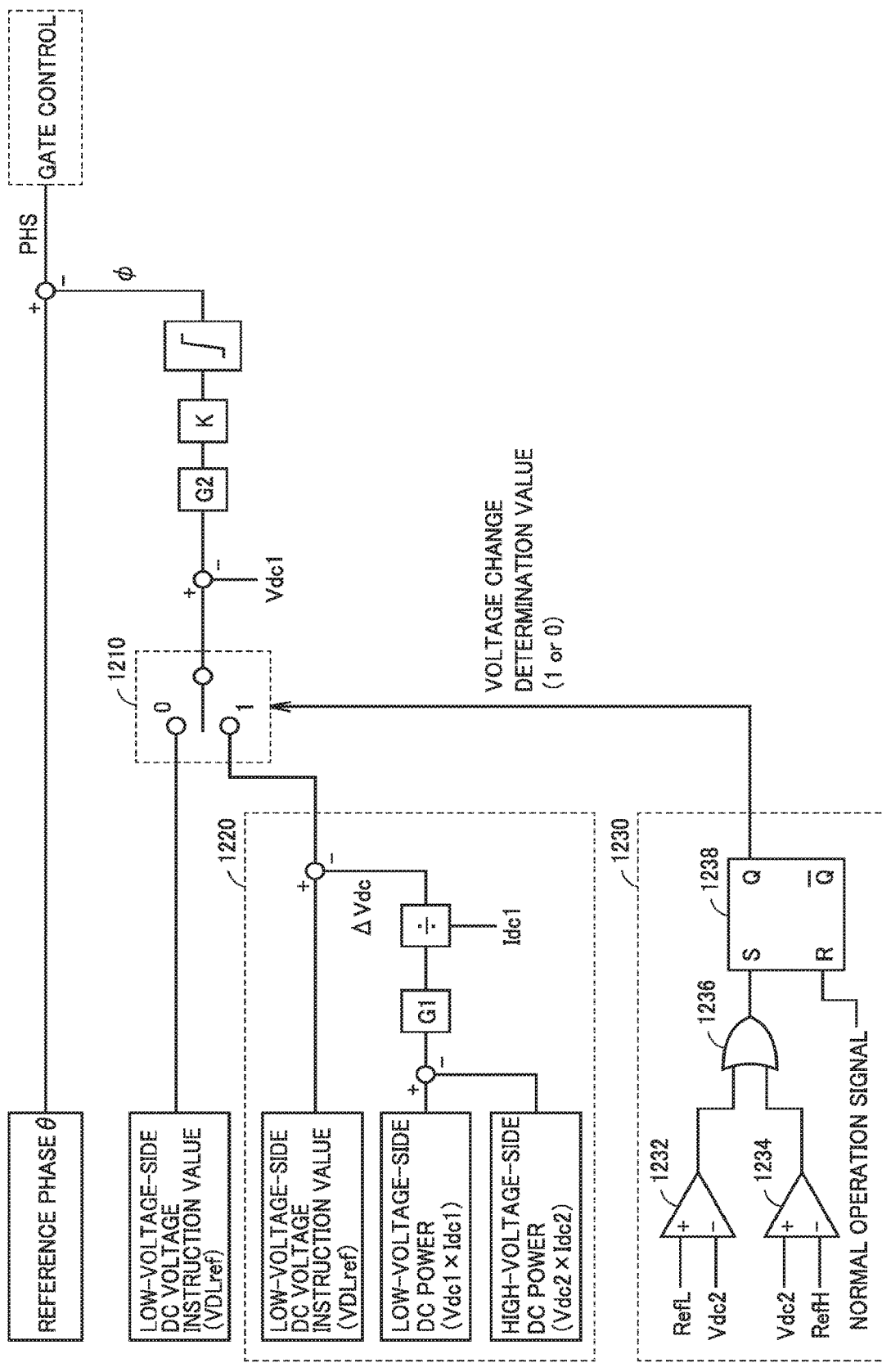
FIG. 6 is a functional block diagram for explaining the details of DC voltage control by a first DC/DC converter (DC/DC converter 120) in embodiment 1.

FIG. 6 is a functional block diagram for explaining the details of DC voltage control to be executed by DC voltage control unit 1200 for DC/DC converter 120.

With reference to FIG. 6, DC voltage control unit 1200 includes a switching unit 1210, a low-voltage-side DC voltage instruction value adjusting unit 1220, and a high-voltage-side DC voltage change detector 1230. DC voltage change detector 1230 includes comparators 1232, 1234, an OR circuit 1236, and a flip-flop 1238.

DC voltage change detector 1230 determines whether or not the collection voltage is within a predetermined range, i.e., determines the presence or absence of change in collection voltage. Comparator 1232 outputs "1" when high-voltage-side voltage detection value Vdc2 (i.e., the collection voltage) is lower than the lower limit value RefL. Comparator 1234 outputs "1" when the collection voltage is higher than the upper limit value RefH.

OR circuit 1236 receives signals from comparators 1232, 1234 and outputs "1" to flip-flop 1238 when any of the signals is "1". When the output from OR circuit 1236 is "1", flip-flop 1238 is set and outputs, to switching unit 1210, a voltage signal determination value of "1" (which represents the presence of voltage change). On the other hand, when flip-flop 1238 receives a normal operation signal that represents a return to the normal operation, flip-flop 1238 is reset and outputs, to switching unit 1210, a voltage signal determination value of "0" (which represents no voltage change).

When the voltage change determination value from DC voltage change detector 1230 is "0" (i.e., when there is no voltage change in collection voltage), switching unit 1210 switches its input to low-voltage-side DC voltage instruction value VDLref (generated voltage instruction value) from storage 1100, and performs feedback control to regulate the "generated voltage". DC voltage control unit 1200 calculates phase instruction PHS by amplifying the difference between low-voltage-side DC voltage instruction value VDLref and low-voltage-side DC voltage detection value Vdc1, performing feedback control to obtain a gate control amount φ, and subtracting gate control amount φ from a high-voltage-side reference phase θ. Based on this phase instruction PHS, voltage instruction distributing unit 1300 in FIG. 5 produces gate pulses for semiconductor switching devices Q1 to Q8.

On the other hand, when the voltage change determination value from DC voltage change detector 1230 is "1" (i.e., when there is a voltage change in collection voltage), switching unit 1210 switches its input to DC voltage instruction value adjusting unit 1220, and reduces the instruction value of "generated voltage" in accordance with the difference between the input power and the output power. DC voltage instruction value adjusting unit 1220 calculates the input power on the low-voltage side (Vdc1×Idc1) and the output power on the high-voltage side (Vdc2×Idc2) of DC/DC converter 120 based on voltage detection values Vdc1, Vdc2 detected by voltage sensors 230, 240 and based on current detection values Idc1, Tdc2 detected by current sensors 210, 220. DC voltage instruction value adjusting unit 1220 also calculates a voltage control amount ΔVdc by amplifying the difference between the input power and the output power, and dividing it by the low-voltage-side DC current detection value Idc. DC voltage instruction value adjusting unit 1220 corrects DC voltage instruction value VDLref by subtracting this voltage control amount ΔVdc from low-voltage-side DC voltage instruction value VDLref.

That is, when the input power on the low-voltage side is greater than the output power on the high-voltage side (i.e., when the input power is excessive), DC voltage instruction value adjusting unit 1220 reduces low-voltage-side DC voltage instruction value VDLref (generated voltage instruction value). When there is a voltage change in collection voltage, DC voltage control unit 1200 calculates phase instruction PHS based on low-voltage-side DC voltage instruction value VDLref corrected by DC voltage instruction value adjusting unit 1220.

Thus, during steady power transmission, DC/DC converter 120 in embodiment 1 regulates the generated voltage; whereas, when there is a large change in collection voltage on the high-voltage side, DC/DC converter 120 reduces the generated voltage by reducing low-voltage-side DC voltage instruction value VDLref in accordance with the power equivalent to the excessive input power. When the generated voltage is reduced, current limiter 114 of AC/DC converter 110 limits the current to be inputted to DC/DC converter 120. This can reduce the power flowing from wind power plant 10 to DC/DC converter 120. As a result, the disturbance in DC grid voltage can be curbed.

Figure 7:
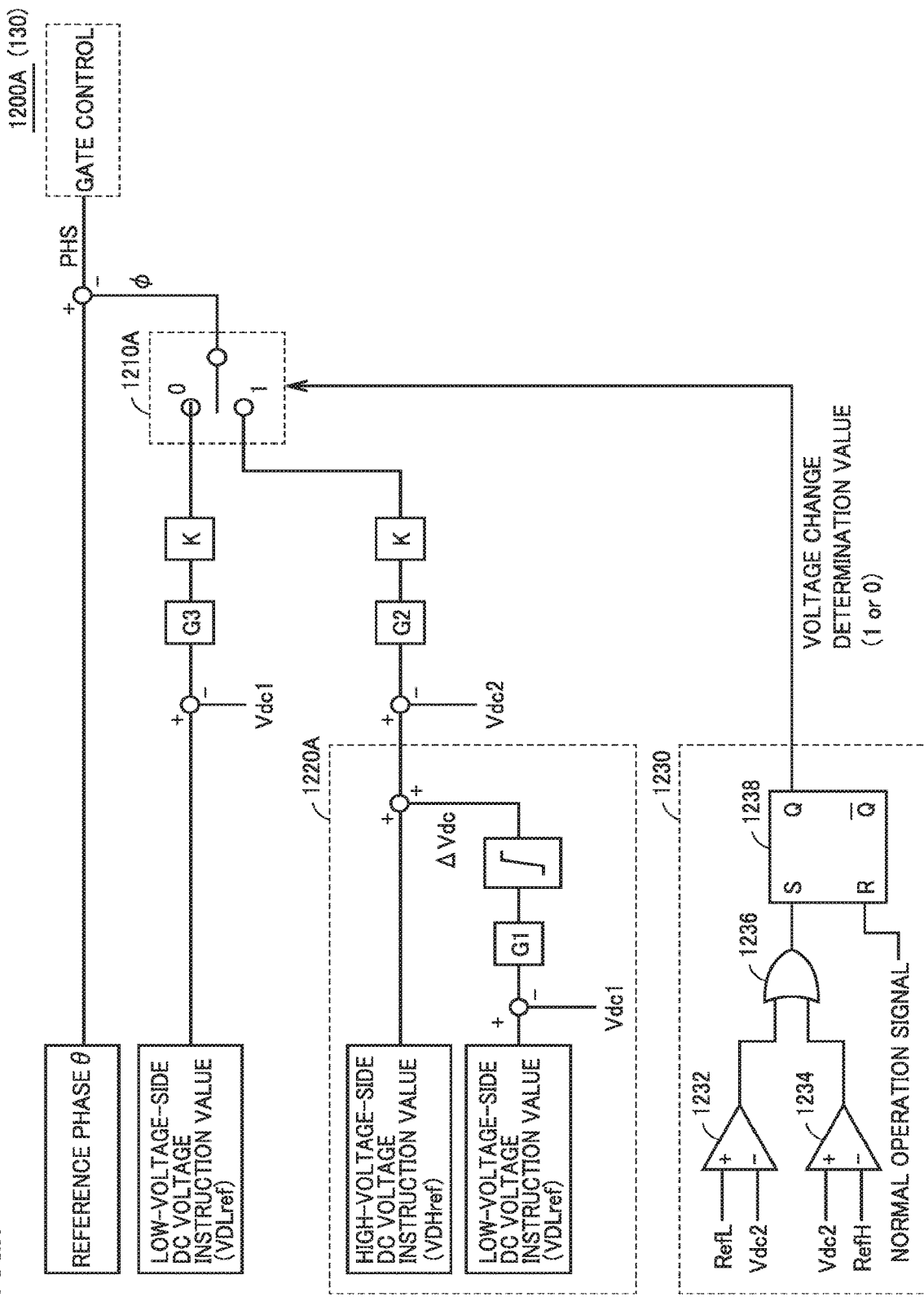
FIG. 7 is a functional block diagram for explaining the details of DC voltage control by a second DC/DC converter (DC/DC converter 130) in embodiment 1.

FIG. 7 is a functional block diagram for explaining the details of DC voltage control to be executed by a DC voltage control unit 1200A for DC/DC converter 130.

With reference to FIG. 7, DC voltage control unit 1200A includes a switching unit 1210A, a high-voltage-side DC voltage instruction value adjusting unit 1220A, and a high-voltage-side DC voltage change detector 1230. DC voltage change detector 1230 is the same as that of FIG. 6, and thus the detailed explanation thereof is not repeated.

When the voltage change determination value from DC voltage change detector 1230 is "0" (i.e., when there is no voltage change in collection voltage), switching unit 1210A switches its input to low-voltage-side DC voltage instruction value VDLref (collection voltage instruction value) from storage 1100, and performs feedback control to regulate the "collection voltage". Specifically, DC voltage control unit 1200A calculates phase instruction PHS by amplifying the difference between low-voltage-side DC voltage instruction value VDLref and low-voltage-side DC voltage detection value Vdc1, performing feedback control to obtain gate control amount φ, and subtracting gate control amount φ from high-voltage-side reference phase θ. Based on this phase instruction PHS, voltage instruction distributing unit 1300 in FIG. 5 produces gate pulses for semiconductor switching devices Q1 to Q8.

On the other hand, when the voltage change determination value from DC voltage change detector 1230 is "1" (i.e., when there is a voltage change in collection voltage), switching unit 1210A switches its input to DC voltage instruction value adjusting unit 1220A, so as to switch the subject of control to the DC voltage on the high-voltage side (i.e., transmission voltage). When DC/DC converter 130 is switched to the transmission voltage control, DC/DC converter 130 cannot control the collection voltage on the low-voltage side. DC/DC converter 120, which needs to control the generated voltage as described above, also cannot control the collection voltage.

Accordingly, in embodiment 1, when DC/DC converter 130 is switched to the transmission voltage control, DC voltage instruction value adjusting unit 1220A determines the difference between the instruction value and detection value of collection voltage, and corrects the instruction value of transmission voltage in accordance with the difference, thereby curbing an increase in collection voltage. Specifically, DC voltage instruction value adjusting unit 1220A calculates voltage control amount ΔVdc by amplifying the difference between low-voltage-side DC voltage instruction value VDLref (collection voltage instruction value) and low-voltage-side DC voltage detection value Vdc1 (collection voltage detection value), and adds voltage control amount ΔVdc to high-voltage-side DC voltage instruction value VDHref (transmission voltage instruction value), thereby correcting high-voltage-side DC voltage instruction value VDHref. At this time, DC voltage instruction value adjusting unit 1220A sets voltage control amount ΔVdc within the steady operation range of transmission voltage (substantially within ±5%). DC voltage instruction value adjusting unit 1220A then calculates phase instruction PHS by amplifying the difference between corrected high-voltage-side DC voltage instruction value VDHref and high-voltage-side DC voltage detection value Vdc2, performing feedback control to obtain gate control amount φ, and subtracting gate control amount φ from high-voltage-side reference phase θ. Based on this phase instruction PHS, voltage instruction distributing unit 1300 in FIG. 5 produces gate pulses for semiconductor switching devices Q1 to Q8.

Thus, during normal power transmission, DC/DC converter 130 regulates the collection voltage; whereas, when there is a large change in transmission voltage on the high-voltage side, DC/DC converter 130 switches the subject of control from the collection voltage to the transmission voltage, and corrects the instruction value of transmission voltage in accordance with the difference between the instruction value and detection value of collection voltage, within the steady operation range of transmission voltage. Thus, the power transmission can be continued at a transmission voltage within the steady operation range, while curbing an increase in collection voltage.

As described above, embodiment 1 provides a DC transmission system including two self-commutated DC/DC converters interconnected with direct current. In this system, when a DC/AC converter for controlling the transmission voltage (third voltage) stops due to abnormality in an AC distribution grid or abnormality in the DC/AC converter, a first DC/DC converter which has been controlling the generated voltage (first voltage) is switched so that the first DC/DC converter adjusts the power flowing from a wind power plant by reducing the generated voltage in accordance with the input and output voltages. Further, a second DC/DC converter which has been controlling the collection voltage (second voltage) is switched so that the second DC/DC converter controls the transmission voltage in accordance with the change in collection voltage. Thus, even when the DC/AC converter stops due to abnormality in, for example, the AC distribution grid, the DC grid voltage can be quickly stabilized. This allows continuing transmission of power generated by the wind power plant to the DC distribution grid.

Embodiment 2

Embodiment 1 has described an example of a DC transmission system including two DC/DC converters interconnected with a DC grid. Embodiment 2 describes an example of a DC transmission system including one self-commutated DC/DC converter interconnected with a DC grid.

Figure 8:
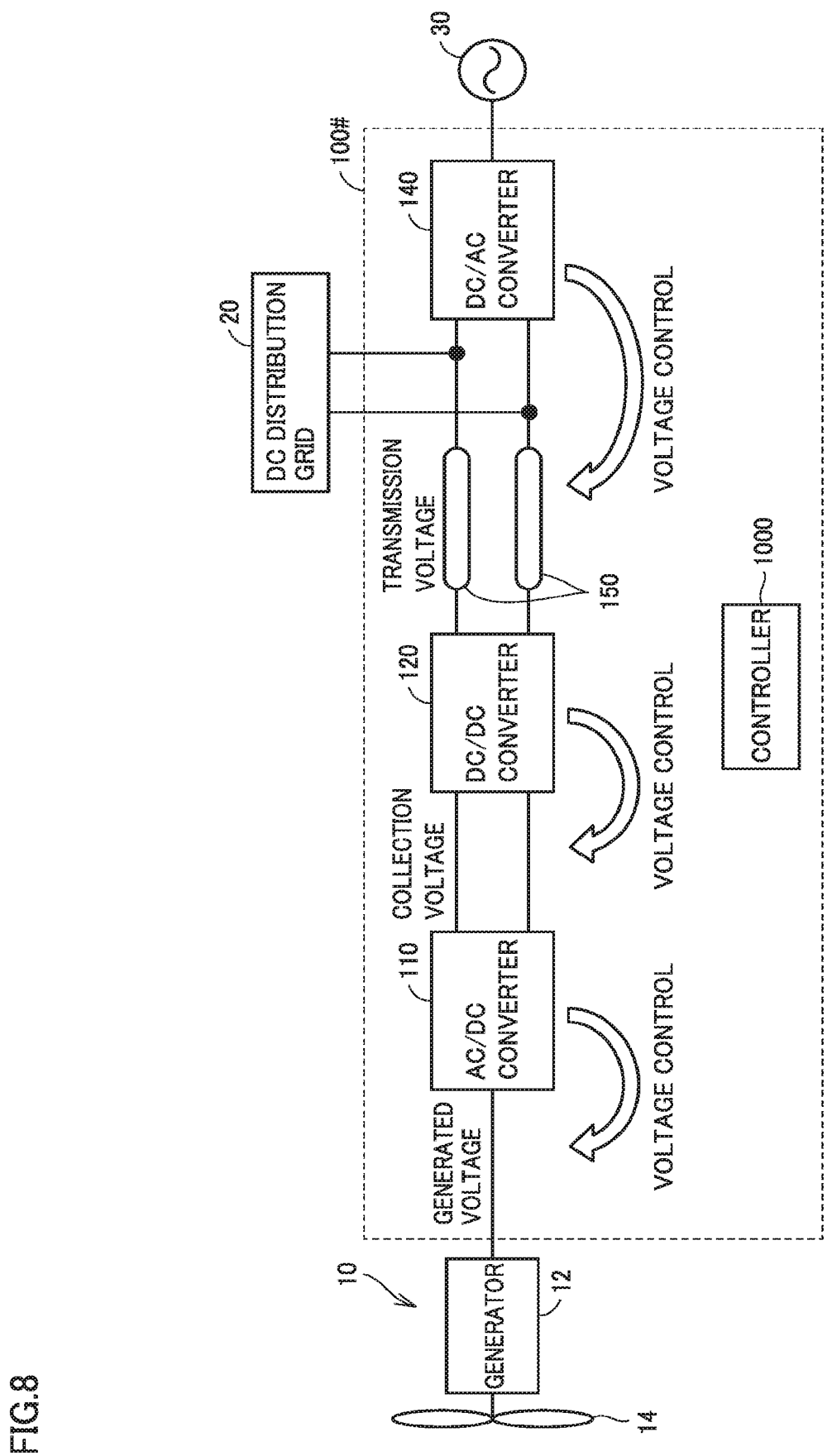
FIG. 8 is a schematic diagram of a DC transmission system according to embodiment 2.

FIG. 8 is a schematic diagram of a DC transmission system 100# according to embodiment 2. FIG. 8 does not include DC/DC converter 130 included in DC transmission system 100 in FIG. 1. In the case of FIG. 8, AC power generated by wind power plant 10 corresponds to the "generated voltage", DC power obtained by conversion by AC/DC converter 110 corresponds to the "collection voltage", and DC power boosted by DC/DC converter 120 corresponds to the "transmission voltage". The explanation of the elements in FIG. 8 common with FIG. 1 is not repeated.

In DC transmission system 100#, during a normal operation, the transmission voltage is controlled by DC/AC converter 140, the collection voltage is controlled by DC/DC converter 120, and the generated voltage is controlled by AC/DC converter 110.

Figure 9:
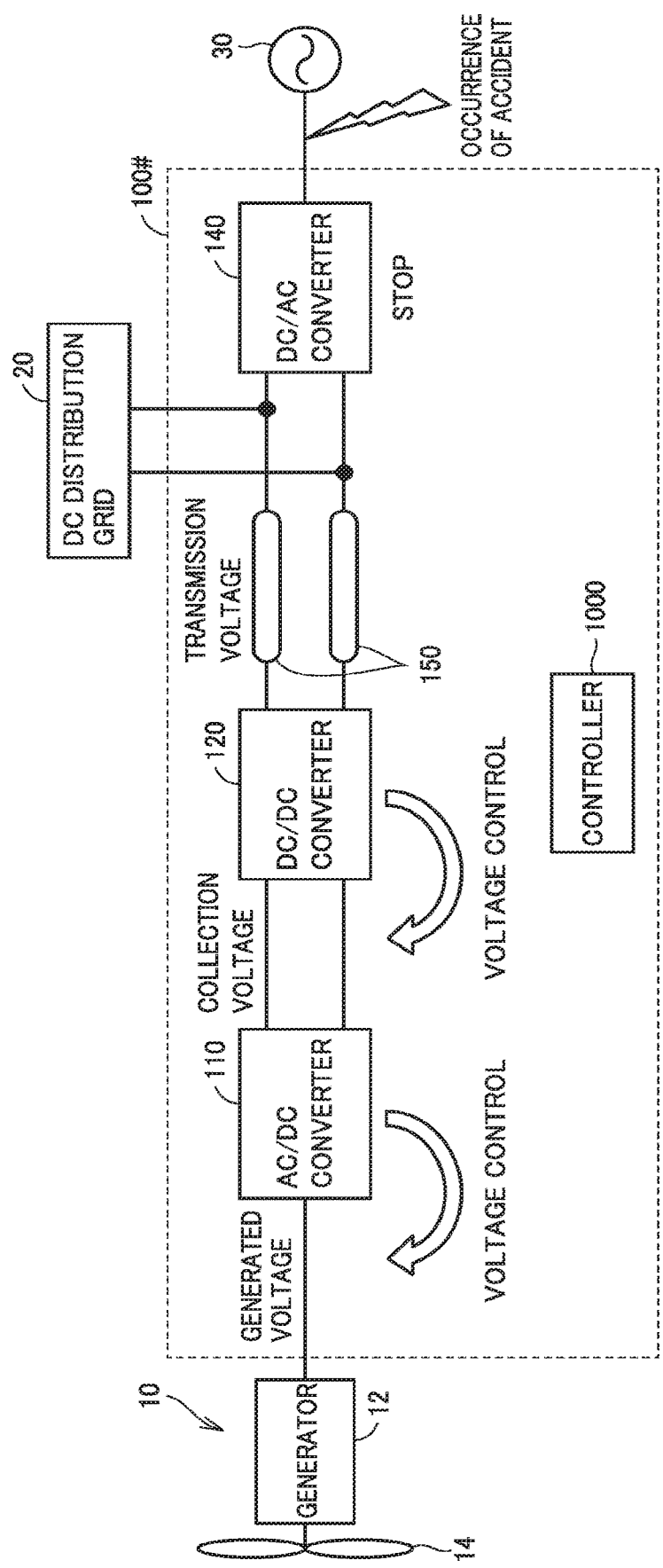
FIG. 9 is a diagram for explaining the control status of each converter when an abnormality occurs in an AC distribution grid in the DC transmission system shown in FIG. 8.

As shown in FIG. 9, when DC/AC converter 140 stops due to abnormality in AC distribution grid 30 or in DC/AC converter 140, DC/DC converter 120 reduces the low-voltage-side DC voltage instruction value (collection voltage instruction value) in accordance with the difference between the input power and the output power, as in embodiment 1. This prevents inflow of excessive power from wind power plant 10. Further, in embodiment 2, gate control amount φ is corrected based on the difference between the instruction value and detection value of DC voltage on the high-voltage side (transmission voltage) of DC/DC converter 120, thus curbing a change in transmission voltage. By switching the control of DC/DC converter 120 in response to the stop of DC/AC converter 140, the DC grid voltage can be quickly stabilized.

Figure 10:
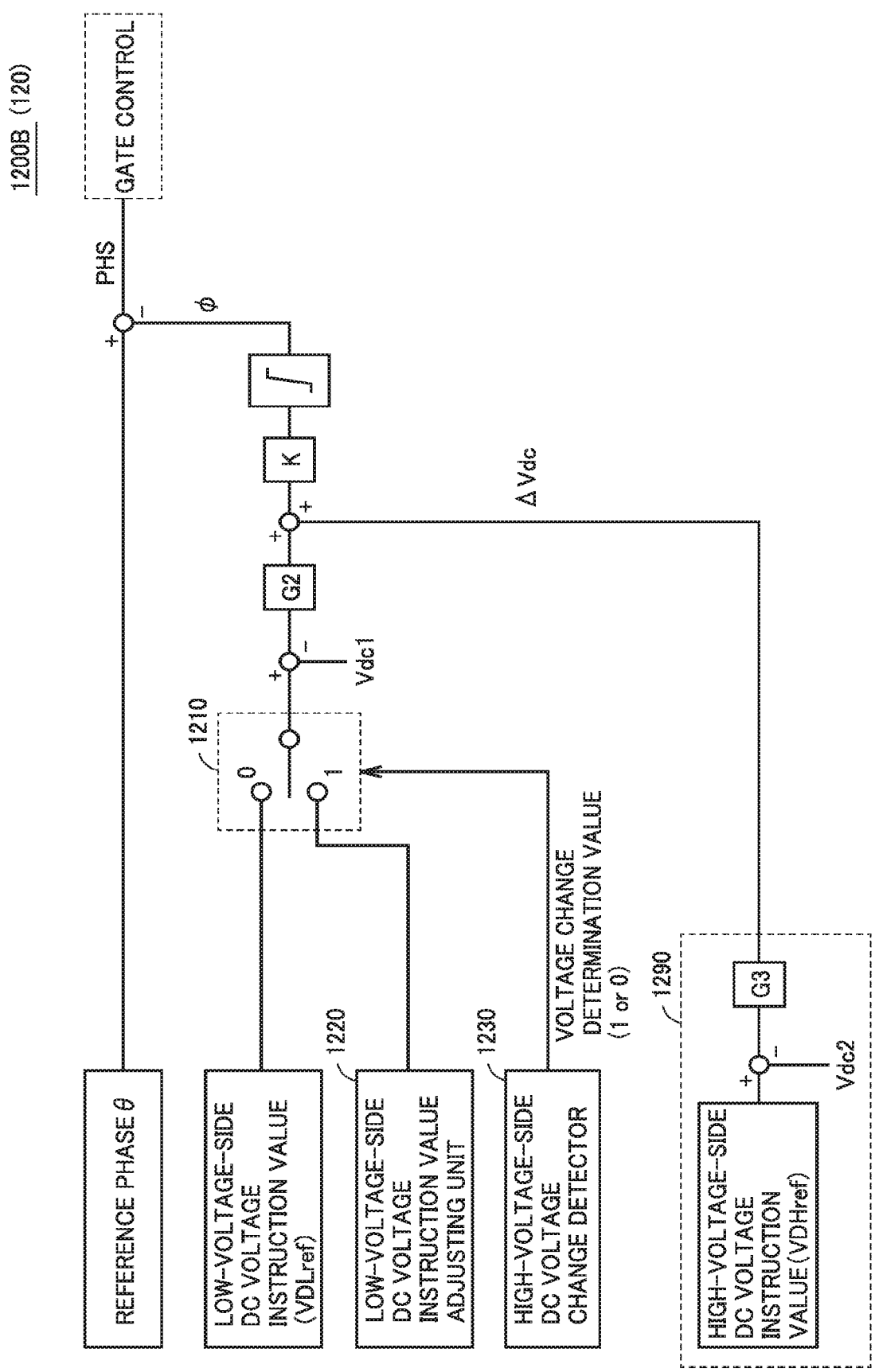
FIG. 10 is a functional block diagram for explaining the details of DC voltage control by a DC/DC converter in embodiment 2.
Figure 11:
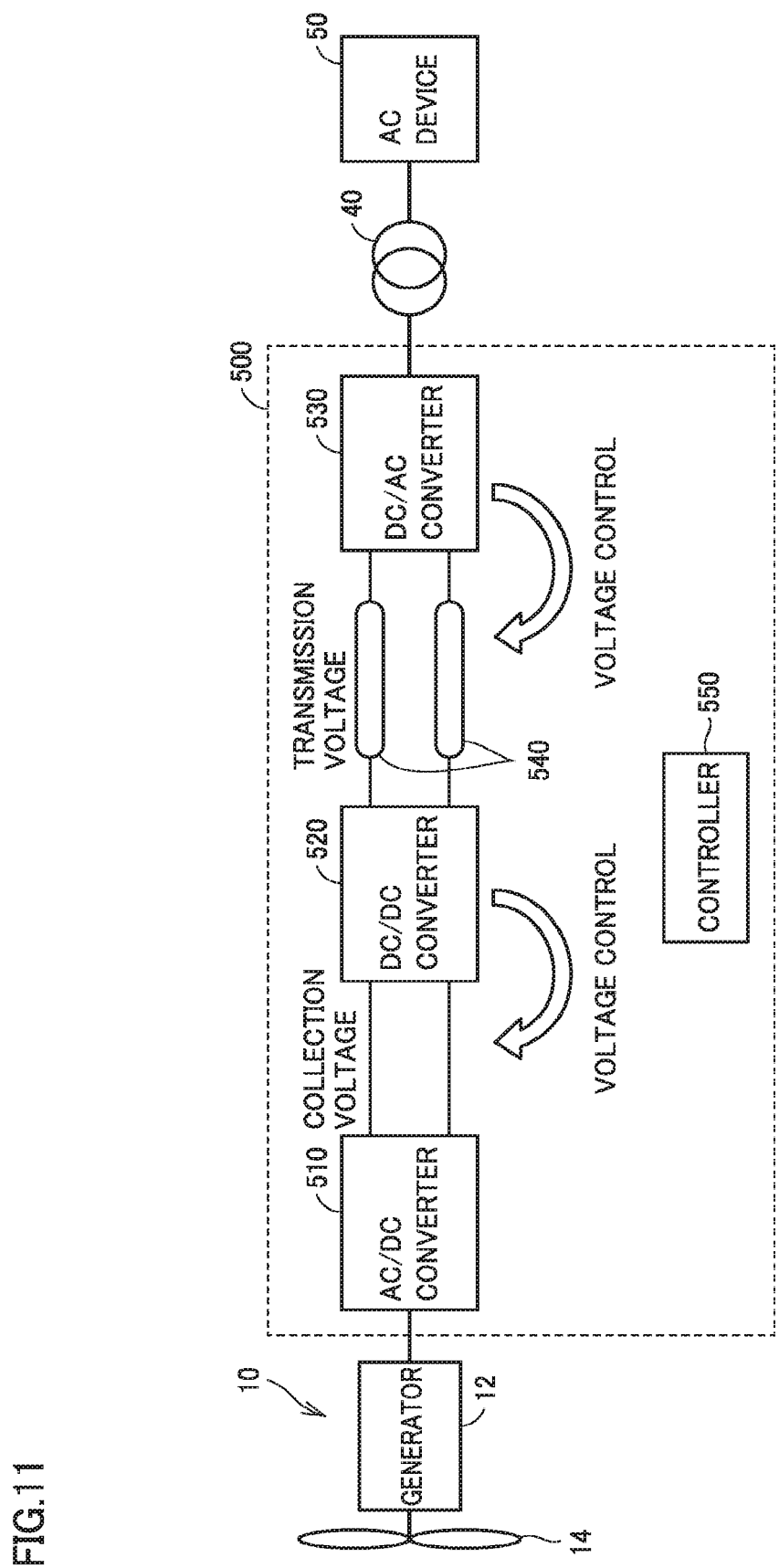
FIG. 11 is a schematic diagram of a DC transmission system in PTL 1.
Figure 12:
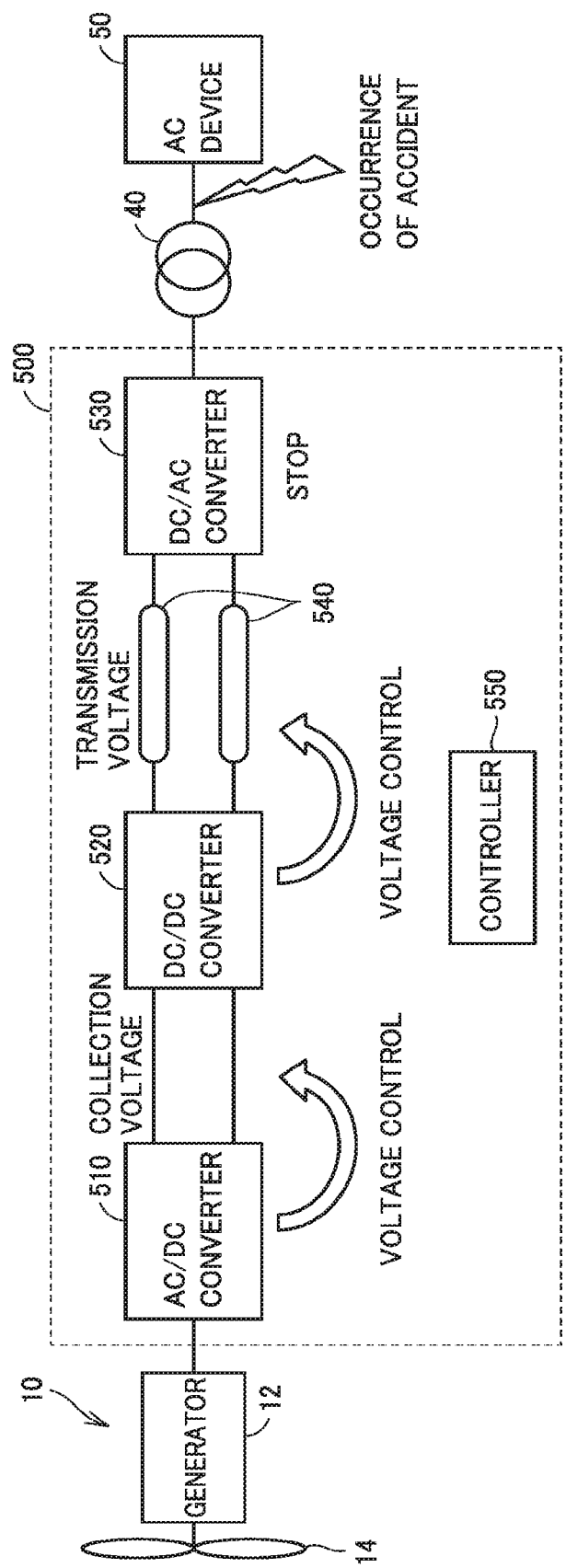
FIG. 12 is a diagram for explaining the control status of each converter when an abnormality occurs in an AC distribution grid in the DC transmission system shown in FIG. 11.

FIG. 10 is a functional block diagram for explaining the details of DC voltage control to be executed by a DC voltage control unit 1200B of DC/DC converter 120 in embodiment 2. DC voltage control unit 1200B shown in FIG. 10 includes a high-voltage-side DC voltage deviation correcting unit 1290 in addition to the configuration of FIG. 6 in embodiment 1. The explanation of the elements in FIG. 10 common with FIG. 6 is not repeated.

With reference to FIG. 10, similarly to DC voltage control unit 1200 in embodiment 1, when there is a change in transmission voltage (which is a DC voltage on the high-voltage side), DC voltage control unit 1200B switches the collection voltage instruction value on the low-voltage side, from low-voltage-side DC voltage instruction value VDLref to an instruction value corrected by DC voltage instruction value adjusting unit 1220. DC voltage control unit 1200B calculates gate control amount φ by adding voltage control amount ΔVdc to an amplified difference between the selected collection voltage instruction value and low-voltage-side DC voltage detection value Vdc1, where voltage control amount ΔVdc is obtained by amplifying the difference between instruction value VDHref and detection value Vdc2 of the DC voltage on the high-voltage side (transmission voltage) calculated by high-voltage-side DC voltage deviation correcting unit 1290. DC voltage control unit 1200B then calculates phase instruction PHS by subtracting calculated gate control amount φ from high-voltage-side reference phase θ. Based on this phase instruction PHS, voltage instruction distributing unit 1300 in FIG. 5 produces gate pulses for semiconductor switching devices Q1 to Q8.

Thus, in the case of a DC voltage grid including only one DC/DC converter, when the DC/AC converter stops, the collection voltage can be reduced in accordance with the power equivalent to the excessive power caused by the change in transmission voltage. In accordance with the reduction in collection voltage, the current limiter circuit of the AC/DC converter limits the input current, thus reducing the current flowing into the DC/DC converter. Thus, the disturbance of the DC grid voltage can be curbed. Further, by correcting the gate control amount based on the difference between the instruction value and detection value of transmission voltage, the change in transmission voltage can be curbed.

As described above, embodiment 2 provides a DC transmission system including one self-commutated DC/DC converter interconnected with a DC grid. In this system, when a DC/AC converter for controlling the transmission voltage (second voltage) stops due to abnormality in an AC distribution grid or abnormality in the DC/AC converter, the DC/DC converter which has been controlling the collection voltage (first voltage) adjusts the power flowing from a wind power plant, by reducing the generated voltage in accordance with the input and output voltages. Further, the DC/DC converter adds a correction amount to a control amount of the DC/DC converter, the correction amount being equivalent to the difference between the instruction value and detection value of transmission voltage. Thus, the change in transmission voltage is curbed. Thus, when the DC/AC converter stops due to abnormality in, for example, the AC distribution grid, the DC grid voltage can be quickly stabilized. This allows continuing transmission of power generated by the wind power plant to the DC distribution grid.

Embodiment 3

Embodiment 1 and embodiment 2 have described a case in which, when a DC/AC converter stops due to abnormality in, for example, an AC distribution grid during steady power transmission, a DC transmission system including a self-commutated DC/DC converter stabilizes the DC grid voltage and continues power transmission to the distribution grid.

Embodiment 3 describes a case in which a DC/AC converter stops due to abnormality (e.g. an accident) in an AC distribution grid, and then the accident is removed to return to normal power transmission. A DC transmission system shown in FIG. 4 is used as an example.

As described above, when DC/AC converter 140 stops due to abnormality in AC distribution grid 30 or in DC/AC converter 140, DC/DC converter 130 is autonomously switched from regulation of the collection voltage (collection voltage control) to regulation of the transmission voltage (transmission voltage control).

Specifically, DC voltage instruction value adjusting unit 1220A shown in FIG. 7 calculates voltage control amount ΔVdc by amplifying the difference between low-voltage-side DC voltage instruction value VDLref (collection voltage instruction value) and low-voltage-side DC voltage detection value Vdc1 (collection voltage detection value). Then, DC voltage instruction value adjusting unit 1220A adds voltage control amount ΔVdc to high-voltage-side DC voltage instruction value VDHref (transmission voltage instruction value) to correct high-voltage-side DC voltage instruction value VDHref. At this time, DC voltage instruction value adjusting unit 1220A sets voltage control amount ΔVdc to the negative direction (for example, 95% of the secondary-side rated voltage of DC/DC converter 130) within the steady operation range of transmission voltage (substantially within ±5%). Then, DC voltage instruction value adjusting unit 1220A calculates phase instruction PHS by amplifying the difference between corrected high-voltage-side DC voltage instruction value VDHref and high-voltage-side DC voltage detection value Vdc2, performing feedback control to obtain gate control amount φ, and subtracting gate control amount φ from high-voltage-side reference phase θ. Based on this phase instruction PHS, voltage instruction distributing unit 1300 in FIG. 5 produces gate pulses for semiconductor switching devices Q1 to Q8 and controls the transmission voltage.

When DC/AC converter 140 stops and DC/DC converter 120 detects a collection voltage larger than high-voltage-side DC voltage instruction value VDHref as shown in FIG. 6, then the generated voltage is controlled with low-voltage-side DC voltage instruction value VDLref being corrected in accordance with the change in the amount of power outputted from DC/DC converter 120.

When DC/AC converter 140 starts operating out of the stopped state after removal of the AC grid accident, DC/AC converter 140 controls the transmission voltage so that the transmission voltage will become the DC-side rated voltage of DC/AC converter 140 (equal to the secondary-side rated voltage of DC/DC converter 130). At this time, high-voltage-side DC voltage Vdc2 is greater than high-voltage-side DC voltage instruction value VDHref corrected by DC/DC converter 130. When it is detected that the difference between corrected transmission voltage instruction value VDHref and high-voltage-side DC voltage detection value Vdc2 is equal to or greater than a reference difference value (substantially equal to or greater than 5%) and that the output current of DC/DC converter 130 is equal to or less than a reference current value (e.g. 0 A), then DC/DC converter 130 is switched to a normal operation. Accordingly, the voltage change determination value is switched to 0, and DC/DC converter 130 is autonomously switched from the transmission voltage control to the collection voltage control.

When DC/DC converter 130 is switched to the collection voltage control and thus the collection voltage becomes equal to or less than the primary-side rated voltage of DC/DC converter 130 (equal to the secondary-side rated voltage of DC/DC converter 120), then DC/DC converter 120 returns low-voltage-side DC voltage instruction value VDLref to the primary-side rated voltage of DC/DC converter 120 and controls the generated voltage of windmill 14 to be the primary-side rated voltage of DC/DC converter 120. Thus, the input power to DC/DC converter 120 is recovered.

In DC transmission system in FIG. 9 described in embodiment 2, the control by DC/DC converter 120 is basically the same as that of FIG. 4, if the DC voltage on the high-voltage side is regarded as the transmission voltage. Thus, the detailed explanation is not repeated.

As described above, embodiment 3 provides a DC transmission system including two self-commutated DC/DC converters interconnected with direct current. In this system, when a stopped DC/AC converter recovers from an accident, a second DC/DC converter which has been controlling the transmission voltage (third voltage) determines that the DC/AC converter has recovered, based on reduction in the difference between the transmission voltage and the corrected high-voltage-side DC voltage instruction value, and based on reduction in output current. Thus, the second DC/DC converter is autonomously switched from the transmission voltage control to the collection voltage control. Further, when the collection voltage becomes equal to or less than the primary-side rated voltage of the second DC/DC converter (equal to the secondary-side rated voltage of the first DC/DC converter) in response to the switch of the second DC/DC converter to the collection voltage control, a first DC/DC converter, which has been controlling the generated voltage, autonomously returns the generated voltage (first voltage) of the windmill to the primary-side rated voltage of the first DC/DC converter, thus increasing the power input to the first DC/DC converter. Thus, when the DC/AC converter recovers from an accident, the DC grid voltage can be quickly stabilized, thus allowing continuing transmission of power generated by the wind power plant to the DC distribution grid.

It should be understood that the embodiments disclosed herein are illustrative in every respect, not limitative. The scope of the present invention is defined not by the above description but by the terms of the claims, and is intended to include any modification within the meaning and scope equivalent to the terms of the claims.

REFERENCE SIGNS LIST

10: wind power plant; 12: generator; 14: windmill; 20: DC distribution grid; 30: AC distribution grid; 40, TR1: transformer; 50: AC device; 100, 100#, 500: DC transmission system; 110, 510: AC/DC converter; 120, 130, 520: DC/DC converter; 140, 530: DC/AC converter; 112: diode bridge; 114: current limiter; 122, 124: inverter circuit; 150, 540: transmission line; 200, 210, 220: current sensor; 230, 240: voltage sensor; 550, 1000: controller; 1100: storage; 1200, 1200A, 1200B: DC voltage control unit; 1210, 1210A: switching unit; 1220, 1220A: DC voltage instruction value adjusting unit; 1230: DC voltage change detector; 1232, 1234: comparator; 1236: OR circuit; 1238: flip-flop; 1290: high-voltage-side DC voltage deviation correcting unit; 1300: voltage instruction distributing unit; C0 to C2: smoothing capacitor; D1 to D8: diode; NL0 to NL2, PL0 to PL2: power line; Q1 to Q8: semiconductor switching device

The invention claimed is:

1. A DC transmission system to transmit AC power generated by a generator to an AC distribution grid and a DC distribution grid using DC power, the DC transmission system comprising:
   an AC/DC converter to output DC power by converting AC power from the generator;
   a DC/DC converter to output DC power having a second voltage by converting the DC power having a first voltage outputted from the AC/DC converter; and
   a DC/AC converter to output, to the AC distribution grid, AC power by converting the DC power outputted from the DC/DC converter,
   the DC power outputted from the DC/DC converter also being transmitted to the DC distribution grid,
   the DC/DC converter being configured to, when the second voltage changes, control the first voltage in response to the change in the second voltage, and
   when the second voltage is equal to or greater than a threshold value, the DC/DC converter is configured to reduce power flowing in the DC/DC converter, by reducing an instruction value of the first voltage.

2. The DC transmission system according to claim 1, wherein the DC/DC converter is configured to correct the instruction value of the first voltage in accordance with a difference between input power and output power of the DC/DC converter.

3. The DC transmission system according to claim 2, wherein the DC/DC converter is configured to reduce the change in the second voltage by adding a correction amount to a control amount of the DC/DC converter, the correction amount being equivalent to a difference between an instruction value and a detection value of the second voltage.

4. The DC transmission system according to claim 1, wherein the AC/DC converter includes a current limiter circuit to limit a current flowing through the AC/DC converter.

5. The DC transmission system according to claim 1, wherein
the DC/AC converter is configured to control the second voltage in response to the change in the second voltage, and
the DC/DC converter is configured to control the first voltage in response to a change in the first voltage.

6. The DC transmission system according to claim 1, wherein
the DC/DC converter includes
a first conversion unit including a plurality of semiconductor switching devices, the first conversion unit being configured to receive the DC power having the first voltage and convert the received DC power into AC power,
a transformer to transfer the AC power from the first conversion unit,
a second conversion unit including a plurality of semiconductor switching devices, the second conversion unit being configured to receive the AC power transferred by the transformer and convert the received AC power into the DC power having the second voltage, and
a controller to control the first conversion unit and the second conversion unit using a pulse signal, and
the controller is configured to control a voltage ratio between the first voltage and the second voltage by adjusting a phase angle between a pulse signal of the second conversion unit and a pulse signal of the first conversion unit.

7. The DC transmission system according to claim 2, wherein
when the second voltage is equal to or less than a secondary-side rated voltage of the DC/DC converter during controlling the first voltage by correcting the instruction value of the first voltage by the DC/DC converter, the DC/DC converter is configured to set the instruction value of the first voltage to a primary-side rated voltage of the DC/DC converter, and control the first voltage in response to a change in the first voltage.

8. A DC transmission system to transmit AC power generated by a generator to an AC distribution grid and a DC distribution grid using DC power, the DC transmission system comprising:
an AC/DC converter to output DC power by converting AC power from the generator;
a first DC/DC converter to output DC power having a second voltage by converting the DC power having a first voltage outputted from the AC/DC converter;
a second DC/DC converter to output DC power having a third voltage by converting the DC power having the second voltage outputted from the first DC/DC converter; and
a DC/AC converter to output, to the AC distribution grid, AC power by converting the DC power outputted from the second DC/DC converter,
the DC power outputted from the second DC/DC converter also being transmitted to the DC distribution grid, when the third voltage changes,
the second DC/DC converter being configured to control the third voltage in response to the change in the third voltage, and
the first DC/DC converter being configured to control the first voltage in response to a change in the second voltage, and
when the third voltage is equal to or greater than a threshold value, the second DC/DC converter is configured to correct an instruction value of the third voltage in accordance with a difference between an instruction value and a detection value of the second voltage.

9. The DC transmission system according to claim 8, wherein, when the second voltage is equal to or greater than a reference value, the first DC/DC converter is configured to reduce power flowing in the first DC/DC converter, by reducing an instruction value of the first voltage in accordance with a difference between input power and output power of the first DC/DC converter.

10. The DC transmission system according to claim 8, wherein, when a difference between the third voltage and a corrected instruction value of the third voltage is equal to or greater than a reference difference value and when an output current of the second DC/DC converter is equal to or less than a reference current value during controlling the third voltage by the second DC/DC converter, the second DC/DC converter is configured to control the second voltage in response to the change in the second voltage.

11. The DC transmission system according to claim 8, wherein, when the second voltage is equal to or less than a secondary-side rated voltage of the first DC/DC converter during controlling the first voltage by the first DC/DC converter, the first DC/DC converter is configured to set an instruction value of the first voltage to a primary-side rated voltage of the first DC/DC converter, and control the first voltage in response to a change in the first voltage.

12. A DC/DC converter connected between an AC/DC converter and a DC/AC converter, the AC/DC converter being configured to output DC power by converting AC power from a generator, the DC/AC converter being configured to output, to an AC distribution grid, AC power by converting DC power, the DC/DC converter comprising:
a first conversion unit including a plurality of semiconductor switching devices, the first conversion unit being configured to receive DC power having a first voltage outputted from the AC/DC converter and being configured to convert the received DC power into AC power,
a transformer to transfer the AC power from the first conversion unit,
a second conversion unit including a plurality of semiconductor switching devices, the second conversion unit being configured to receive the AC power transferred by the transformer and being configured to convert the received AC power into the DC power having a second voltage to output the DC power to the DC/AC converter; and
a controller to control the first conversion unit and the second conversion unit using a pulse signal,
the controller being configured to control a voltage ratio between the first voltage and the second voltage by adjusting a phase angle between a pulse signal of the second conversion unit and a gate pulse signal of the first conversion unit, in response to a change in the second voltage, the controller being configured to correct an instruction value of the first voltage, and control the phase angle so that the first voltage follows the corrected instruction value of the first voltage, or correct an instruction value of the second voltage in accordance with a difference between a detection value and an instruction value of the first voltage, and control the phase angle so that the second voltage follows the corrected instruction value of the second voltage, and the controller further configured to when the second voltage is equal to or greater than a threshold value, control the DC/DC converter to reduce power flowing in the DC/DC converter, by reducing an instruction value of the first voltage.

* * * * *